(12) United States Patent
Faruque et al.

(10) Patent No.: US 10,046,723 B1
(45) Date of Patent: Aug. 14, 2018

(54) SELF-ADAPTIVE, ENERGY-ABSORBING BUMPER

(71) Applicant: Ford Global Technologies, LLC, Dearborn, MI (US)

(72) Inventors: Mohammed Omar Faruque, Ann Arbor, MI (US); James Chih Cheng, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/458,809

(22) Filed: Mar. 14, 2017

(51) Int. Cl.
*B60R 19/18* (2006.01)
*B60R 19/44* (2006.01)
*B60R 19/52* (2006.01)

(52) U.S. Cl.
CPC .............. *B60R 19/18* (2013.01); *B60R 19/44* (2013.01); *B60R 19/52* (2013.01); *B60R 2019/1893* (2013.01)

(58) Field of Classification Search
CPC . B60R 2019/1893; B60R 19/18; B60R 19/44; B60R 19/52
See application file for complete search history.

(56) References Cited

U.S. PATENT DOCUMENTS

| | | | | |
|---|---|---|---|---|
| 4,061,384 A * | 12/1977 | Montgomery | .......... | B60R 19/18 293/109 |
| 6,634,702 B1 * | 10/2003 | Pleschke | ................. | B60R 19/18 293/102 |
| 6,663,150 B1 * | 12/2003 | Evans | ....................... | B60D 1/52 293/120 |
| 7,004,519 B2 * | 2/2006 | Roussel | .................. | B60R 19/18 293/120 |
| 7,044,515 B2 * | 5/2006 | Mooijman | .............. | B60R 19/18 293/102 |
| 7,059,642 B2 * | 6/2006 | Ohno | ....................... | B60R 19/18 293/120 |
| 7,568,746 B2 * | 8/2009 | Jaarda | ..................... | B60R 19/18 293/102 |
| 7,866,716 B2 * | 1/2011 | Perucca | .................. | B60R 19/18 293/102 |
| 8,056,964 B2 * | 11/2011 | Schafer | .................... | B60R 19/52 296/203.02 |
| 8,684,427 B2 * | 4/2014 | Marur | ..................... | B60R 19/18 293/120 |
| 9,327,663 B2 | 5/2016 | Farooq | | |

(Continued)

FOREIGN PATENT DOCUMENTS

DE 102012000631 A1 * 7/2013 ............. B60R 19/18
FR 2936469 A1 4/2010

(Continued)

*Primary Examiner* — Pinel E Romain
(74) *Attorney, Agent, or Firm* — David R. Stevens; Stevens Law Group (57) ABSTRACT

A passive energy absorber to be supported by a bumper of a vehicle is disclosed. The passive energy absorber may include a base extending laterally, multiple fins, and multiple stoppers. Each fin may extend longitudinally from the base and be spaced laterally from adjacent fins to form lateral gaps therebetween. Each stopper may form, with a corresponding portion of the base, a triangular prism in a different lateral gap. The base, multiple fins, and multiple stoppers may be formed of polymeric material.

20 Claims, 8 Drawing Sheets

(56) References Cited

U.S. PATENT DOCUMENTS

| | | | |
|---|---|---|---|
| 9,604,586 B2* | 3/2017 | Nickel | B60R 19/03 |
| 9,610,911 B2* | 4/2017 | Nickel | B60R 19/18 |
| 2005/0104392 A1 | 5/2005 | Liebhard | |
| 2006/0181089 A1 | 8/2006 | Andre | |
| 2008/0023972 A1* | 1/2008 | Ohno | B60R 19/18 |
| | | | 293/155 |
| 2008/0061567 A1* | 3/2008 | Mae | B60R 19/03 |
| | | | 293/124 |
| 2010/0013250 A1* | 1/2010 | Suzuki | B60R 19/18 |
| | | | 293/132 |
| 2017/0144618 A1* | 5/2017 | Martini | B60R 19/18 |

FOREIGN PATENT DOCUMENTS

| | | |
|---|---|---|
| RU | 2328386 C1 | 7/2008 |
| WO | WO-2016193935 A1 | 12/2016 |

* cited by examiner

SELF-ADAPTIVE, ENERGY-ABSORBING BUMPER

BACKGROUND

Field of the Invention

This invention relates to vehicular systems and more particularly to systems and methods for bumpers that are well suited to handle a variety of impact conditions.

Background of the Invention

Bumpers on the front and rear of vehicles are important safety features. However, it is difficult for any given bumper to handle diverse impact conditions well. Accordingly, what is needed is a system and method for improving the performance of bumpers in diverse impact conditions.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
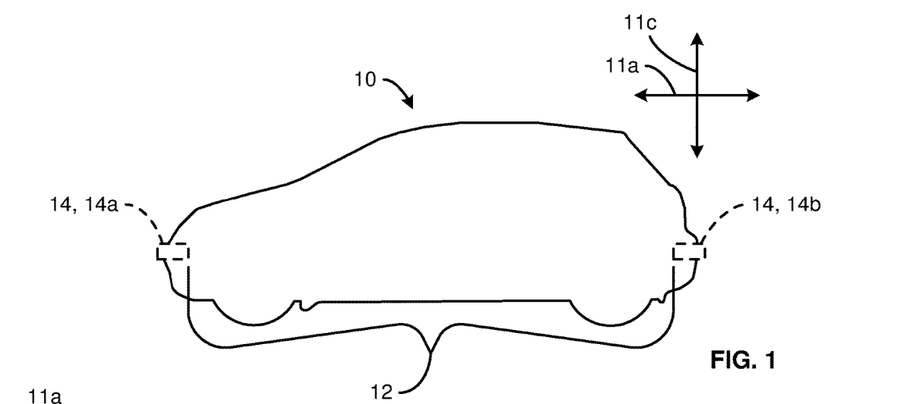
FIG. 1 is a schematic diagram illustrating one embodiment of the technological context within which a bumper system in accordance with the present invention may operate.
Figure 2:
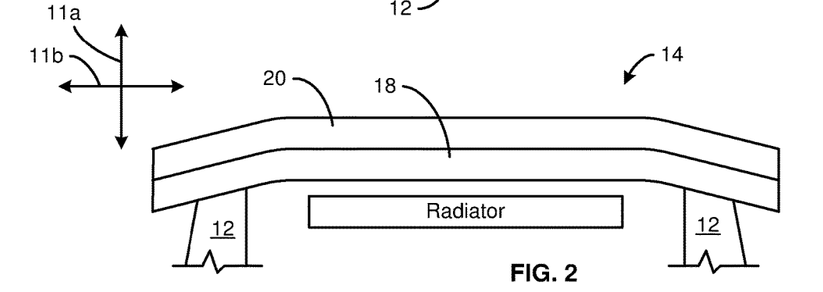
FIG. 2 is a schematic diagram of a top view of one embodiment of a bumper system in accordance with the present invention.
Figure 3:
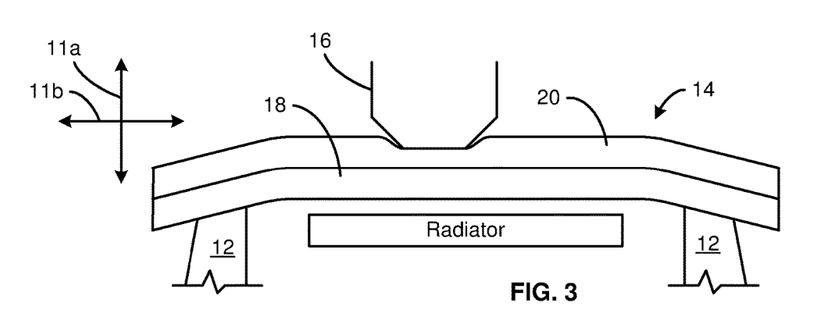
FIG. 3 is a schematic diagram of an object impacting the bumper system of FIG. 2.

Referring to FIGS. 1-3, in selected embodiments, a vehicle 10 in accordance with the present invention may define or be described in terms of a coordinate system comprising a longitudinal direction 11a, lateral direction 11b, and transverse direction 11c that are substantially orthogonal to one another. The longitudinal direction 11a may extend along a length or long axis of the vehicle 10. The lateral direction 11b may extend side to side and correspond to a width of the vehicle 10. The transverse direction 11c may extend up and down and correspond to a height of the vehicle 10.

A vehicle 10 in accordance with the present invention may comprise a structural system 12. A structural system 12 may include a frame or chassis, a body, or some combination thereof (e.g., a unitary body (or "unibody") that functions as both a frame and body). In certain embodiments, a structural system 12 may include and/or support one or more bumper systems 14. For example, a structural system 12 may include and/or support a front bumper system 14a and a back bumper system 14b spaced from one another in the longitudinal direction 11a and located proximate opposite longitudinal extremes of the structural system 12.

A bumper system 14 may protect a vehicle 10 and/or other object 16 should the vehicle 14 drive or reverse into that object 16. This protection may place conflicting requirements on a bumper system 14. For example, the protection appropriate for a 40 kph impact with the leg of a pedestrian may be very different from the protection appropriate for a 15 kph impact with another vehicle. Thus, a bumper system 14 in accordance with the present invention may be configured to acceptably respond to a diverse set of impacts.

In selected embodiments, to acceptably respond to a diverse set of impacts, a bumper system 14 may include a support 18 (e.g., a relative rigid back portion) and an energy absorber 20 (e.g., a deformable front portion). A support 18 may be substantially rigid and function as a traditional bumper. For example, a support 18 may be configured to resolve the forces of a minor collision in a manner that protects the occupants of the vehicle 10 and minimizing repair costs. In certain embodiments, a support 18 may be made of sheet metal (e.g., stamped sheet metal) comprising steel (e.g., high strength steel), aluminum, or the like. Thus, a support 18 may be referred to as a bumper.

An energy absorber 20 may form or provide a small crumple zone. In selected embodiments, an energy absorbing 20 may be made of polymeric materials such as plastics. An energy absorber 20 may be mounted to a support 18 in a position directly outboard of the support 18. Thus, impact forces (e.g., longitudinal impact forces) reaching a support 18 may first pass through an energy absorber 20. In that some of the energy of an impact may be absorbed or consumed in the crumpling of an energy absorber 20, the force that needs to be resolved by a support 18 may be lower. Moreover, in certain embodiments, a bumper system 14 comprising a support 18 and an energy absorber 20 may be configured to acceptably respond to a diverse set of impacts.

For example, an energy absorber 20 may be well suited to absorb the energy associated with certain relatively low energy impacts. Accordingly, for certain relatively low energy impacts, an energy absorber 20 may prevent the corresponding support 18 and object 16 from being damaged or excessively damaged. However, such an energy absorber 20 may not be well suited to absorb the energy associated with certain relatively high energy impacts. Accordingly, for those relatively high energy impacts, the majority of the energy (e.g., the total energy of the impact minus that portion the energy absorber 20 was able to absorb or consume) may be passed to a corresponding support 18 that may be better equipped to resolve that energy.

Figure 4:
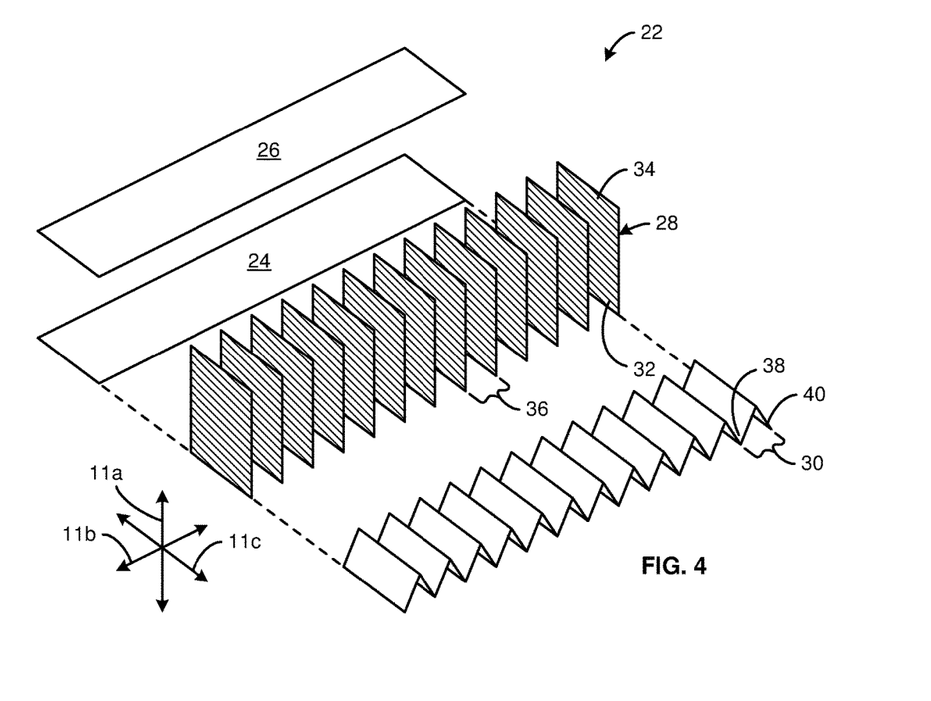
FIG. 4 is an exploded perspective view of a selected length of a core structure of one embodiment of an energy absorber in accordance with the present invention.
Figure 5:
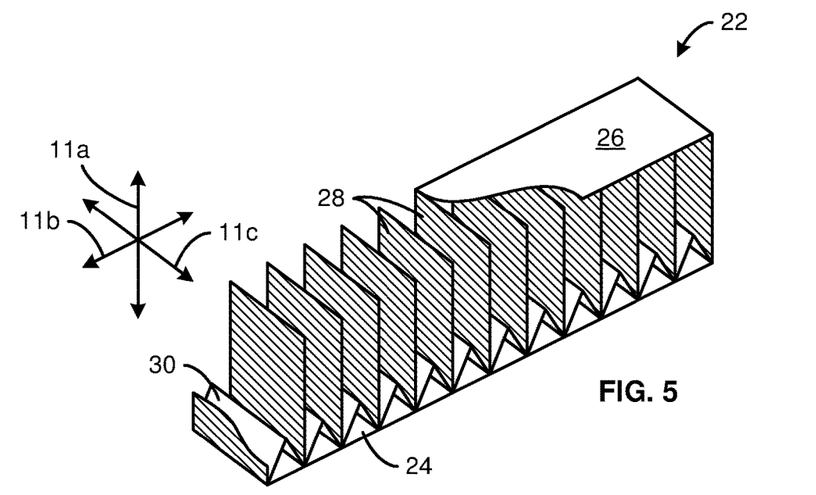
FIG. 5 is an assembled cutaway perspective view of the selected length of the core structure of FIG. 4.
Figure 6:
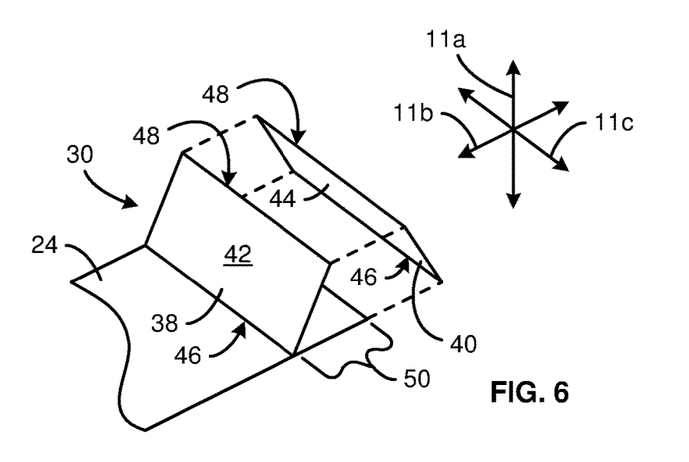
FIG. 6 is an exploded, partial, perspective view of selected components of the core structure of FIG. 4.

Referring to FIGS. 4-6, in selected embodiments, a bumper system 14 may be designed to meet conflicting requirements. For a low speed impact (e.g., a pendulum test) at 4 kph, the bumper system 14 may be designed to be sufficiently stiff to minimize damage. The resulting bumper system 14 may also minimize damage to a hood and other structural components in a Research Council for Automobile Repairs (RCAR) damageability test at 15 kph. Additionally, to protect a pedestrian leg during an impact at 40 kph, the bumper system 14 may be compliant enough (e.g., less stiff) to minimize leg injuries.

Thus, a bumper system 14 in accordance with the present invention may mitigate bumper damage (e.g., damage to a support 18 of a bumper system 14) as well as damage to the structures behind the bumper system 14 (e.g., the radiator, etc.) in low speed bumper impact and RCAR tests and mitigate pedestrian leg injuries in low speed damageability (LSD) pedestrian protection tests. A bumper system 14 may accomplish this with an energy absorber 20 that is cost effective and weight effective and does not require any sensing or active structure. Moreover, the energy absorber 20 may be easily retrofit to existing vehicles (e.g., wherein the bumper of the existing vehicle may function as or be a support 18 in a bumper system 14 in accordance with the present invention).

In certain embodiments, an energy absorber 20 in accordance with the present invention may comprise a core structure 22 (e.g., a topologically optimum core structure) that passively adapts and deforms accordingly to different bumper impact scenarios such as low speed bumper impacts, RCAR impact tests, and pedestrian leg impacts. For example, in selected embodiments, an energy absorber 20 may comprise a core structure 20 that is wrapped in or covered by a plastic cover (e.g., covered with a class A type plastic fascia). In certain embodiments, a core structure 22 may include a base 24, a top 26, a plurality of fins 28, a plurality of stoppers 30, and the like or a combination or sub-combination thereof.

A base 24 may be an element (e.g., planar element) that extends primarily in the lateral direction 11b and secondarily in the transverse direction 11c. A top 26 may be an element (e.g., a planar element) that is spaced or offset in the longitudinal direction 11a from a base 24. A top 26 may extend substantially parallel to the base 24. Thus, a top 26 may extend primarily in the lateral direction 11b and secondarily in the transverse direction 11c. In selected embodiments, a base 24 may be positioned proximate or adjacent a support 18 and a top 26 may be positioned outboard of the base 24.

Each fin 28 of the plurality of fins 28 may have a proximal end 32 connected to a base 24 and a distal end 34 extending away from the vehicle 12 (and the base 24) in the longitudinal direction 11a. In certain embodiments, each fin 28 may be an element (e.g., a substantially planar element) that extends primarily in the longitudinal direction 11a and secondarily in the transverse direction 11c (or primarily in the transverse direction 11c and secondarily in the longitudinal direction 11a). In certain embodiments, the distal end 34 of one or more fins 28 may connect to a top 26.

Each fin 28 may be spaced in the lateral direction 11b from adjacent fins 28. The spacing between adjacent fins 28 may form a plurality of lateral gaps 36. In selected embodiments, each stopper 30 of the plurality of stoppers 30 may be positioned within a different lateral gap 36. Each stopper 30 may having a first end 38 connecting to the base 24 proximate the proximal end 32 of a first adjacent fin 28 (e.g., a fin 28 defining a first boundary of the lateral gap 36 within which the corresponding stopper 30 is located) and a second end 40 connecting to the base 24 proximate the proximal end 32 of a second adjacent fin 28 (e.g., a fin 28 defining a second, opposite boundary of the lateral gap 36 within which the corresponding stopper 30 is located).

In selected embodiments, one or more stoppers 30 may include a first planar member 42 and a second planar member 44 connected to the first planar member 42. The first and second planar members 42, 44 may each comprise a proximal edge 46 and a distal edge 48. The distal edge 48 of the first planar member 42 may connect to the distal edge 48 of the second planar member 48. The proximal edge 46 of the first planar member 42 may form the first end 38 of the corresponding stopper 30. The proximal edge 46 of the second planar member 44 may form the second end 40 of the corresponding stopper 30. The first planar member 42 may extend at an acute angle with respect to the second planar member 44.

In certain embodiments, each stopper 30 may form, with a corresponding portion 50 of the base 24, a triangular prism in a corresponding lateral gap 36. For example, a first planar member 42, second planar member 44, and a corresponding portion 50 of the base 50 may form three sides of the triangular prism. The triangular prism may have a long axis that extends in the transverse direction 11c. The resulting triangulation of the stoppers 30 may render them significantly more rigid (e.g., more resistant to deflection or bending) that the adjacent fins 28.

Figure 7:
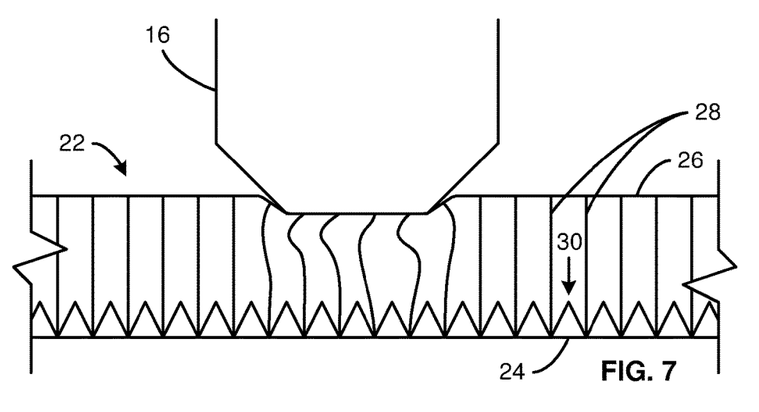
FIG. 7 is a schematic diagram of a top view of one embodiment of an energy absorber in an initial phase of impacting an object in accordance with the present invention.
Figure 8:
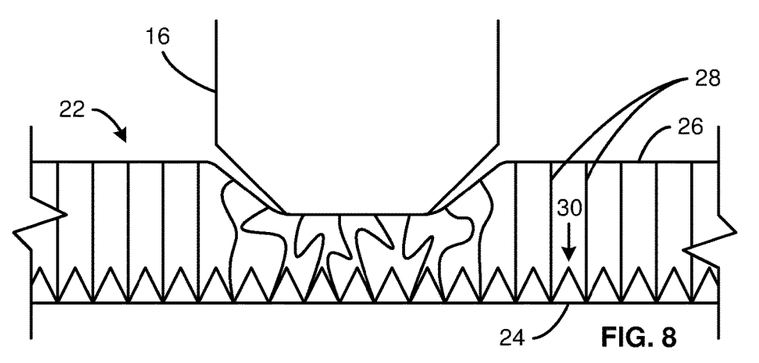
FIG. 8 is a schematic diagram of a top view of one embodiment of an energy absorber in an intermediate phase of impacting an object in accordance with the present invention.
Figure 9:
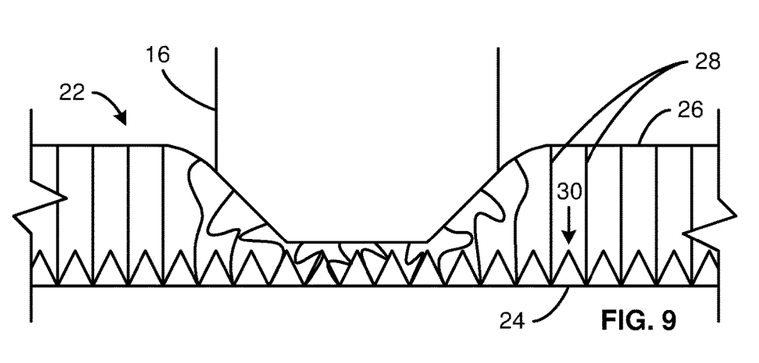
FIG. 9 is a schematic diagram of a top view of one embodiment of an energy absorber in a terminal phase of impacting an object in accordance with the present invention.

Referring to FIGS. 7-9, during an impact between an object 16 and an energy absorber 20 mounted to a support 18, the core structure 22 of the energy absorber 20 may deflect, bend, and/or crumple. For example, during an initial phase of an impact, one or more impacted fins 28 (e.g., fins 28 located in an impacted area) may deflect, bend, and/or crumple. Since the stoppers 30 angle away from the impacted fins 28 adjacent thereto, those stoppers 30 may not initially interfere with the deflection, bending, and/or crumpling of the impacted fins 28. Thus, this initial deflection, bending, and/or crumpling of the impacted fins 28 may progress relatively unrestrained (at least by the stoppers 30). The energy required to initially deflect the impacted fins 28 may be depend on the width in the lateral direction 11*b* of the object 16 being impacted. The wider the object 16, the greater the energy required to initially deflect the impacted fins 28.

If the energy of an impact is not completely absorbed during the initial deflection, bending, and/or crumpling of the impacted fins 28, the object 16 may continue to advance into the energy absorber 20. Such an advance may increase the deflection, bending, and/or crumpling of the impacted fins 28. Eventually, the impacting fins 28 may be sufficiently distorted that they come into contact with the stoppers 30 adjacent thereto.

The stoppers 30 may be (e.g., due to a triangulated shape) significantly more resistant to deflection, bending, and/or crumpling than the fins 28. Accordingly, when the impacting fins 28 contact the stoppers 30, the stoppers 30 may tend to hold their ground. The stoppers 30 may resist further deflection of the impacted fins 28. Thus, progressively more energy may be required to advance the object 16 into the energy absorber 20.

Eventually, if the energy of an impact is not completely absorbed beforehand, the impact energy may be applied substantially directly by an object 16 to the stoppers 30. That is, as some point, further deflection, bending, and/or crumpling of the impacted fins 28 may not be possible. At that point, energy may be transferred through the impacted stoppers 30 to the support 18. In certain embodiments, the impacted stoppers 30 may themselves eventually deflect, bend, and/or crumple, which may absorb further energy. Alternatively, the stoppers 30 may be sufficiently strong to simply pass the all the remaining energy of the impact through to the support 18 without deflection, bending, and/or crumpling.

Figure 10:
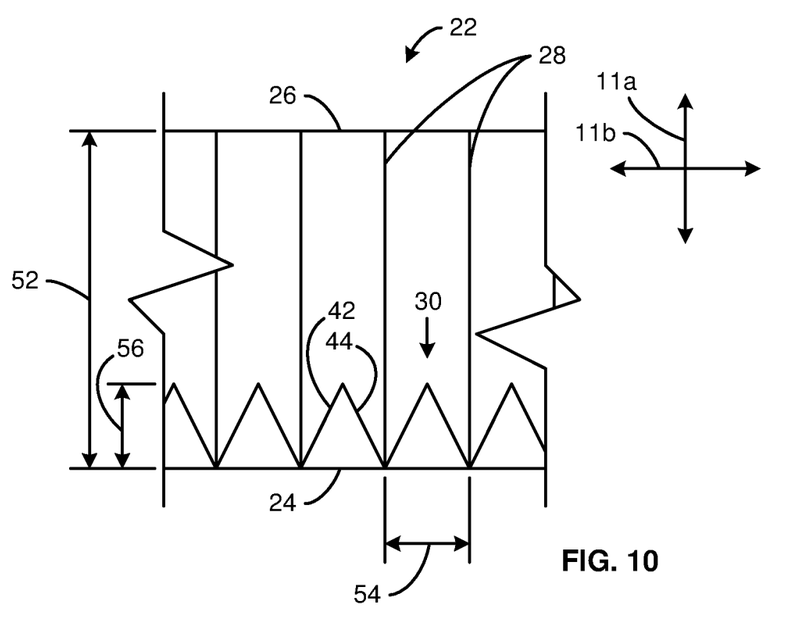
FIG. 10 is a schematic diagram of a top view of one embodiment of a selected length of core structure in accordance with the present invention.

Referring to FIG. 10, various design parameters of a core structure 22 may be selected, controlled, and/or modified in order to provide a desired performance during an impact. Such design parameters may include the material forming the base 24, gage of material forming the base 24, material forming the top 26, gage of material forming the top 26, material forming the fins 28, gage of material forming the fins 28, length 52 of the fins 28 in the longitudinal direction 11*a*, width of the fins 28 in the transverse direction 11*c*, spacing 54 between fins, material forming the stoppers 30, gage of material forming the stoppers 30, height 56 of the stoppers 30 in the longitudinal direction 11*a*, width of the stoppers 30 in the transverse direction 11*c*, spacing 54 between stoppers 30, and the like or a combination or sub-combination thereof.

In selected embodiments, a base 24, top 26, plurality of fins 28, plurality of stoppers 30, and the like or a combination or sub-combination thereof may be formed of a highly ductile plastic. For example, they may be formed of a thermoplastic olefin (e.g., a material comprising: a thermoplastic such as polypropylene, polyethylene, block copolymer polypropylene, or the like; an elastomer or rubber; and a filler), XENOY (e.g., a blend of semi-crystalline polyester such as polybutylene terephthalate or polyethylene terephthalate and polycarbonate), or the like. In certain embodiments, a core structure 22 in accordance with the present invention may be formed as a monolith via a molding processing (e.g., an injection molding process).

In certain embodiments, a core structure 22 may be formed of XENOY with a gage thickness of the fins 28 set at about 3 mm, length 52 of the fins 28 set at about 100 mm, gage thickness of the stoppers 30 set at about 7 mm, height 56 of the stoppers 30 set at about 25 mm, and lateral gap 36 between the fins 28 set at about 30 mm. A core structure 22 having these characteristics was modeled via software and produced favorable results in three different cases. The three cases are summarized below. These three cases are approximations of the actual impact modes. A manufacturing-feasible design may be established through systematic optimization of all relevant design parameters (e.g., the design parameters identified herein) using appropriate computer-aided engineering (CAE) models.

A first modeled case involved a low velocity bumper impact mode at 4 kph. The impactor width (i.e., width of the object 16 in the lateral direction 11*b*) was between 16-24 inches and the mass was high (i.e., corresponded to a vehicle curb weight). The goal for this case was for the core structure 22 to minimize axial deformation (i.e., deformation in the longitudinal direction 11*a*) and, thereby, minimize bumper damage. Simulation results showed an average deformation that was low (i.e., around 25 mm) and an average force of about 25 KN.

A second modeled case involved a pedestrian leg impact at 40 kph. The leg impactor width (i.e., width of the object 16 in the lateral direction 11*b*) was in the range of about 3 inches to about 3.5 inches and the mass was low (i.e., about 13.8 kg). The goal for this case was to allow more deformation to minimize injuries inflicted on the leg. Simulation results showed an average deformation that was high (i.e., around 70 mm) and an average force of about 7 KN. Thus, the second modeled case showed greater deformation and lower force than the first modeled case.

A third modeled case involved a RCAR damageability impact mode at 15 kph. The impactor width (i.e., width of the object 16 in the lateral direction 11*b*) was about 40% of the width of the bumper system 14 in the lateral direction 11*b* and the mass was high (i.e., corresponded to a vehicle curb weight). The goal for this case was to contain axial deformation (i.e., deformation in the longitudinal direction 11*a*) within the energy absorber 20 itself to minimize vehicle-front-end damage. Simulation results showed that the deformation was fully contained with the energy absorber 20. This would indicate that hood and vehicle-front-end damage behind the bumper system 14 should be mitigated.

Figure 11:
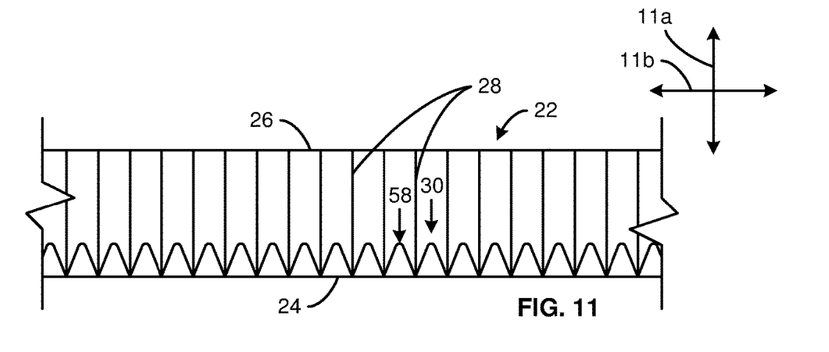
FIG. 11 is a schematic diagram of a top view of an alternative embodiment of a selected length of core structure in accordance with the present invention.

Referring to FIG. 11, in selected embodiments, an interface 58 or connection point between a first planar member 42 and a second planar member 44 may be relatively sharp. In other embodiments, the interface 58 or connection point may be rounded or be defined by a radius. This rounding may lower the triangulation of the corresponding stoppers 30 and, therefore, render the stoppers 30 more pliable. Thus, a degree of rounding of an interface 58 or connection point at the apex of one or more stoppers 30 may be another design parameter that may be varied and/or optimized to obtain a desired performance.

Figure 12:
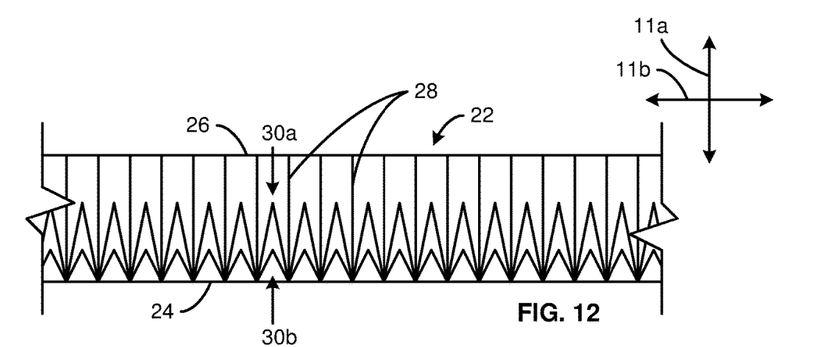
FIG. 12 is a schematic diagram of a top view of another alternative embodiment of a selected length of core structure in accordance with the present invention.

Referring to FIG. 12, in selected embodiments, more than one stopper 30 may be positioned within each lateral gap 36. For example, a core structure 22 may include two stoppers 30*a*, 30*b* within each lateral gap 36 (e.g., a taller, outer stopper 30*a* and a shorter, inner stopper 30*b* that is positioned inside of the taller, outer stopper 30*a*). An outer stopper 30*a* that is relatively tall (i.e., has a greater height 56) may contact and reinforce a deflecting fin 28 sooner. An inner stopper 30*b* that is relatively short (i.e., has a lower height 56) may be more rigid. This may provide more control over the energy absorption of the corresponding core structure 22. Thus, a number of stoppers 30 within each lateral gap 36 and their respective dimensions may be additional design parameter that may be varied and/or optimized to obtain a desired performance.

Figure 13:
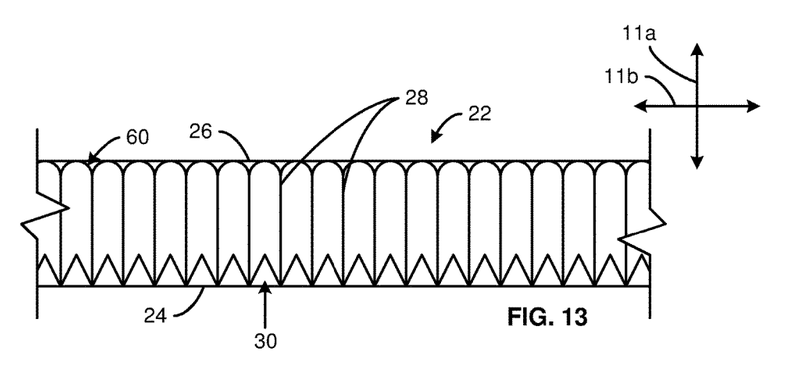
FIG. 13 is a schematic diagram of a top view of another alternative embodiment of a selected length of core structure in accordance with the present invention.
Figure 14:
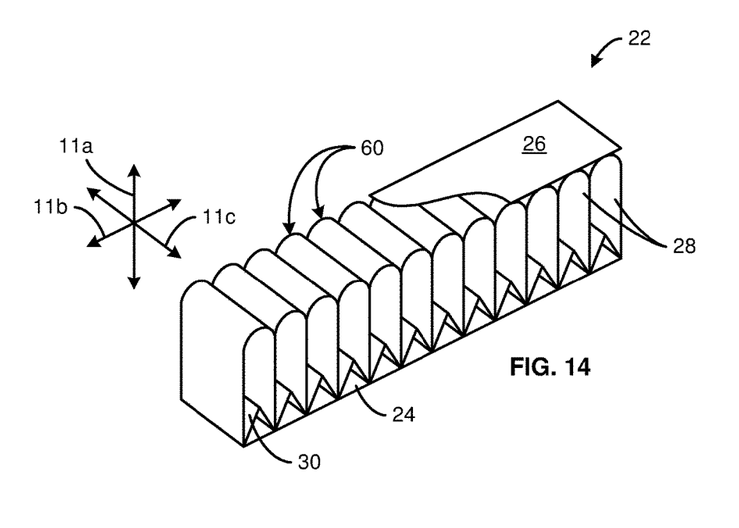
FIG. 14 is a cutaway perspective view a selected length of the core structure of FIG. 13.

Referring to FIGS. 13 and 14, in selected embodiments, one or more fins 28 may include crossover elements 60 that extend to connect one fin 28 to one or more adjacent fins 28. For example, the distal ends 34 of the various fins 28 may be connected to one another by one or more crossover arches 60. In certain embodiments, such crossover elements 60 may take the place of a top 26. Alternatively or in addition thereto, such crossover elements 60 (e.g., rounded crossover arches 60) may lower the initial force peak of an impact. Thus, a shape and location of one or more crossover elements 60 may be additional design parameters that may be varied and/or optimized to obtain a desired performance.

Figure 15:
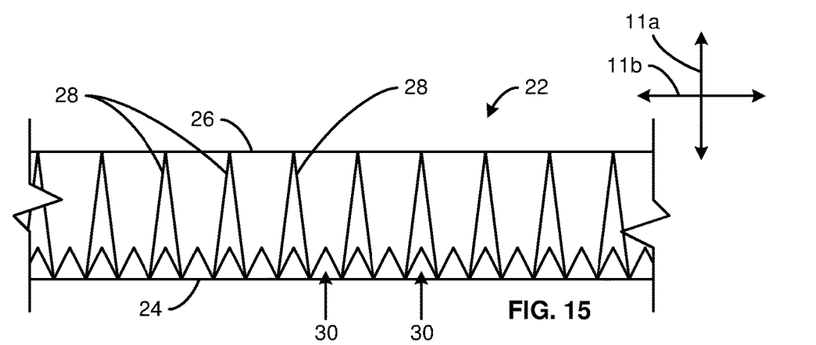
FIG. 15 is a schematic diagram of a top view of another alternative embodiment of a selected length of core structure in accordance with the present invention.
Figure 16:
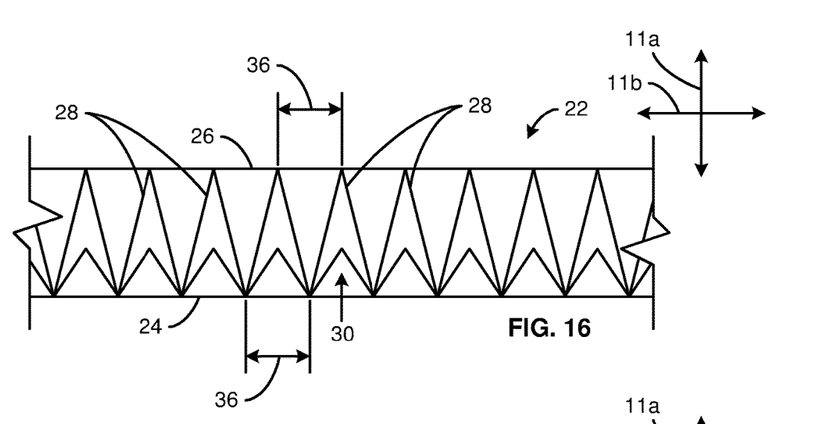
FIG. 16 is a schematic diagram of a top view of another alternative embodiment of a selected length of core structure in accordance with the present invention.
Figure 17:
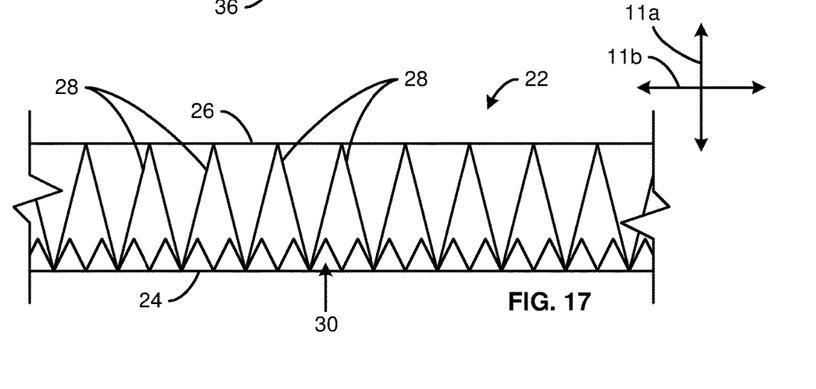
FIG. 17 is a schematic diagram of a top view of another alternative embodiment of a selected length of core structure in accordance with the present invention.

Referring to FIGS. 15-17, in selected embodiments, one or more fins 28 may be positioned and/or oriented such that they are not perpendicular to one or both of a base 24 and a top 26. For example, selected fins 28 (e.g., selected fins 28 that are adjacent to one another) may slant toward each other. In certain embodiments, selected adjacent fins 28 may slant sufficiently toward each other to form a triangle with a vertex (e.g., a vertex at or near a top 26). Thus, like the stoppers 30 in certain embodiments, selected fins 28 may form a triangular prism with a corresponding portion of a base 24 (or a corresponding portion of a top 26).

In selected embodiments, one stopper 38 may be located within each consecutive lateral gap 36. FIG. 15 provides an example of such a configuration. Alternatively, in certain embodiments, different numbers of stoppers 30 may be positioned within different lateral gaps 36. For example, one stopper 30 may be positioned within every other lateral gap 36. Thus, selected fins 28 that are adjacent one another may not have a stopper 30 therebetween. FIG. 16 provides an example of such a configuration. In still other embodiments, multiple stoppers 30 may be located within certain lateral gaps 36. For example, as shown in FIG. 17, two stoppers 30 may be positioned side-by-side within every other lateral gap 36, while the other lateral gaps 36 contain no stoppers 30. Accordingly, the number and spacing of stoppers 30 and the orientation of one or more fins 28 are additional design parameters that may be selected, controlled, and/or modified in order to provide a desired performance during an impact.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," "selected embodiments," "certain embodiments," etc., indicate that the embodiment or embodiments described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

What is claimed is:

1. A vehicle comprising:
an energy absorber comprising
a base mounted laterally to a vehicle chassis support;
a first fin having an end proximal to the base and another end extending distally away from the base;
a second fin having an end proximal to the base and having another end extending distally away from the base, the second fin separated from the first fin by a lateral gap in the base; and
a stopper including a first surface and a second surface, an edge of the first surface intersecting with the base within the lateral gap, an edge of the second surface intersecting with the base within the lateral gap, the first surface and the second surface extending and intersecting distally away from the base to form a triangular prism with a portion of the base between the intersections with the first surface and the second surface in the lateral gap.

2. The vehicle of claim 1, wherein the first fin, the second fin, and the stopper are formed of polymeric material.

3. The vehicle of claim 2, wherein the formed triangular prism extends transversely across the base.

4. The vehicle of claim 1, further comprising:
a third fin having an end proximal to the base and having another end extending proximally away from the base, the third fin separated from the second fin by a second lateral gap;
a second stopper including a first surface and a second surface, an edge of the first surface of the second stopper intersecting with the base within the second lateral gap, an edge of the second surface of the second stopper intersecting with the base within the second lateral gap, the first surface and the second surface of the second stopper extending and intersecting distally away from the base to form a second triangular prism with a portion of the base in the second lateral gap.

5. A vehicle comprising:
a chassis defining longitudinal, lateral, and transverse directions that are mutually orthogonal;
the chassis having a front end and a rear end spaced from the front end in the longitudinal direction;
a passive energy absorber connected to the chassis proximate the front end; and
the passive energy absorber comprising
a base extending in the lateral direction,
a plurality of fins, each fin thereof (a) having a proximal end connected to the base, (b) having a distal end extending away from the chassis and the base in the longitudinal direction, and (c) being spaced in the lateral direction from adjacent fins of the plurality of fins to form a plurality of lateral gaps, and a plurality of stoppers, each stopper including a first surface and a second surface, each stopper being positioned within a different lateral gap of the plurality of lateral gaps and having (a) a proximal edge of the first surface connecting to the base proximate the proximal end of a first adjacent fin of the plurality of fins, (b) a proximal edge of the second surface connecting to the base proximate the proximal end of a second adjacent fin of the plurality of fins, and (c) a distal edge of the first surface and a distal edge of the second surface extending away from the base longitudinally and intersecting one another to form a triangular prism with a portion of the base between the connection of the first surface and the connection of the second surface in the different lateral gap, the intersection at a specified distance longitudinally from the base.

6. The vehicle of claim 5, wherein:
the passive energy absorber further comprises a top extending in the lateral direction; and
the top connecting the distal end of each adjacent fin in the plurality of fins to one another at a second specified distance longitudinally from the base, the second distance greater than the first distance.

7. The vehicle of claim 6, wherein the top, base, plurality of fins, and plurality of stoppers are formed of polymeric material.

8. The vehicle of claim 7, wherein:
the front end of the chassis comprise a front bumper; and
the passive energy absorber is positioned outboard of the front bumper.

9. The vehicle of claim 5, wherein the intersection extends transversely the length of a side of the first surface and extends transversely the length of a corresponding side of the second surface and the intersection is the part of the triangular prism furthest away from the base longitudinally.

10. The vehicle of claim 5, wherein the first surface comprises a first planar member and the second surface comprises a second planar members.

11. The vehicle of claim 5, wherein:
the intersection forms an acute angle between the first surface and the second surface.

12. The vehicle of claim 11, further comprising wherein:
a second plurality of stoppers, each stopper in the second plurality of stoppers including a first surface and a second surface, each stopper in the second plurality of stoppers being positioned within a different lateral gap of the plurality of lateral gaps along with a stopper from among the plurality of stoppers and having (a) a proximal edge of the first surface connecting to the base proximate the proximal end of a first adjacent fin of the plurality of fins, (b) a proximal edge of the second surface connecting to the base proximate the proximal end of a second adjacent fin of the plurality of fins, and (c) a distal edge of the first surface and a distal edge of the second surface extending away from the base longitudinally and intersecting one another to form another triangular prism with the portion of the base in the different lateral gap, the intersection at a second specified distance longitudinally from the base, the second specified distance different than the specified distance.

13. The vehicle of claim 12, wherein the second specified distance is greater than the first specified distance.

14. The vehicle of claim 6, wherein the plurality of stoppers are configured to be more rigid than the plurality of fins.

15. The vehicle of claim 1, wherein the triangular prism has an long axis that extends in the transverse direction.

16. The vehicle of claim 15, further comprising a body combining with the chassis to form a unibody.

17. A vehicle comprising:
a chassis defining longitudinal, lateral, and transverse directions that are mutually orthogonal;
the chassis having a front bumper and a rear bumper spaced from the front bumper in the longitudinal direction;
a passive energy absorber connected to the chassis and positioned to be directly outboard the front bumper; and
the passive energy absorber comprising
a base extending in the lateral direction,
a top being spaced in the longitudinal direction from, and extending parallel to, the base,
a plurality of fins, each fin thereof (a) having a proximal end connected to the base, (b) a distal end connected to the top, and (c) being spaced in the lateral direction from adjacent fins of the plurality of fins to form a plurality of lateral gaps,
a first stopper positioned within a lateral gap of the plurality of lateral gaps, the first stopper including a first surface and a second surface, the first stopper having (a) a proximal edge of the first surface connecting to the base proximate the proximal end of a first adjacent fin of the plurality of fins, (b) a proximal edge of the second surface connecting to the base proximate the proximal end of a first surface of a second stopper, and (c) a distal edge of the first surface and a distal edge of the second surface extending away from the base longitudinally and intersecting one another to form a triangular prism with a portion of the base in the lateral gap, and
the second stopper positioned within the lateral gap, the second stopper including the first surface and a second surface, the second stopper having (a) a proximal edge of the first surface connecting to the base proximate the proximal end of the second surface of the first stopper, (b) a proximal edge of the second surface connecting to the base proximate the proximal end of a second adjacent fin of the plurality of fins, and (c) a distal edge of the first surface and a distal edge of the second surface extending away from the base longitudinally and intersecting one another to form another triangular prism with another portion of the base in the lateral gap.

18. The vehicle of claim 17, wherein the top, base, plurality of fins, the first stopper, and the second stopper are formed of polymeric material.

19. The vehicle of claim 18, wherein:
the intersection of the first surface and the second surface of the first stopper form an acute angle.

20. The vehicle of claim 19, wherein:
the passive energy absorber further comprises a top extending in the lateral direction that connects the distal end of each adjacent fin in the plurality of fins to one another.

* * * * *